(12) United States Patent
Moulin et al.

(10) Patent No.: US 8,582,781 B2
(45) Date of Patent: Nov. 12, 2013

(54) ECHO MODULATION METHODS AND SYSTEMS

(75) Inventors: Pierre Moulin, Champaign, IL (US); Lilly Canel-Katz, Clayton, MO (US)

(73) Assignee: Koplar Interactive Systems International, L.L.C., St. Louis, MO (US)

( * ) Notice: Subject to any disclaimer, the term of this patent is extended or adjusted under 35 U.S.C. 154(b) by 968 days.

(21) Appl. No.: 12/690,814

(22) Filed: Jan. 20, 2010

(65) Prior Publication Data

US 2010/0183162 A1   Jul. 22, 2010

Related U.S. Application Data

(60) Provisional application No. 61/145,776, filed on Jan. 20, 2009.

(51) Int. Cl.
*H04B 3/20* (2006.01)
*H04M 9/08* (2006.01)

(52) U.S. Cl.
USPC .................. 381/66; 379/406.06; 379/406.14; 370/286

(58) Field of Classification Search
USPC ........... 381/66; 379/406.01–406.16; 370/286, 370/289; 455/570
See application file for complete search history.

(56) References Cited

U.S. PATENT DOCUMENTS

| | | | |
|---|---|---|---|
| 6,891,948 B2* | 5/2005 | Takada et al. | 379/406.01 |
| 8,111,833 B2* | 2/2012 | Seydoux | 381/71.1 |
| 8,189,766 B1* | 5/2012 | Klein | 379/406.07 |
| 8,208,621 B1* | 6/2012 | Hsu | 379/406.05 |
| 8,355,511 B2* | 1/2013 | Klein | 381/66 |
| 8,472,616 B1* | 6/2013 | Jiang | 379/406.01 |

OTHER PUBLICATIONS

Bender et al., "Techniques for data hiding", IBM Systems Journal, 1996, pp. 313-336, vol. 35, Nos. 3,4.
Childers et al., "The Cepstrum: A Guide to Processing", Proceeding of the IEEE, 1977, pp. 1428-1443, vol. 65, No. 10.
Craver et al., "Detectors for Echo Hiding Systems", Lecture Notes in Computer Science, 2003, pp. 247-257.
Gerasimov et al., "Things that talk: Using sound for device-to-device and device-to-human communication", IBM Systems Journal, 2000, pp. 530-546, vol. 39, Nos. 3 & 4.
Suzuki et al., "Audio watermark enhanced by LDPC coding for air transmission", Proceedings of the 2006 International Conference on Intelligent Information Hiding and Multimedia Signal Processing.

* cited by examiner

*Primary Examiner* — Xu Mei
(74) *Attorney, Agent, or Firm* — The Small Patent Law Group LLC; Christopher R. Carroll

(57) ABSTRACT

Methods and systems for echo modulation are described. In one embodiment, intensities of a plurality of values in multiple windows of an audio signal may be obtained. The windows may be subject to a periodic boundary condition. A plurality of echo values may be calculated for each of the respective windows. The audio signal may be altered in one or more of the windows using a windowing function and echo values. Additional methods and systems are disclosed.

16 Claims, 16 Drawing Sheets

US 8,582,781 B2

ECHO MODULATION METHODS AND SYSTEMS

CROSS-REFERENCE TO RELATED APPLICATIONS

This application claims the benefit of U.S. Provisional Patent Application entitled "Methods and Systems for Echo Modulation", Ser. No. 61/145,776, filed 20 Jan. 2009, the entire contents of the application is herein incorporated by reference.

FIELD

The present application relates generally to the technical field of signal processing. In a specific example, the present application may relate to a method and system for echo modulation.

BACKGROUND

Content signals including video and audio have been encoded with data for a variety of different uses. The encoded data may be encoded within the audio channel, the video channel, or both the audio and video channel of the content signal. Sometimes, encoding data into the content signal may alter the content signal in a way where the encoding is perceptible when the encoded content signal is reproduced.

DETAILED DESCRIPTION

Example methods and systems for echo modulation are described. In the following description, for purposes of explanation, numerous specific details are set forth in order to provide a thorough understanding of example embodiments. It will be evident, however, to one of ordinary skill in the art that embodiments of the invention may be practiced without these specific details.

A series of bits (1's and 0's) in a digital audio signal are encoded by adding echoes to the audio signal so that, in some embodiments, the encoding is imperceptible. The decoding of the modulated audio signal may recover the encoded bits. An error correction method may be used in conjunction with the encoding method to handle the forms of noise encountered in real applications. In one embodiment, the echo modulation is based on Bender's echo hiding technique.

One example application is for embedding an information bit sequence into a multichannel audio signal. The embedding may be perceptually transparent. The watermarked audio signal may then be compressed and transmitted to a stereo system or a home theater. A microphone in the same room captures the sound wave, which is then digitized and processed for extracting the embedded bit sequence. Another embodiment may involve decoding a signal that is decoded after captured by a sound card. The original audio signal may be a portion of a video signal, may be combined with other data, or may only include audio.

Figure 1:
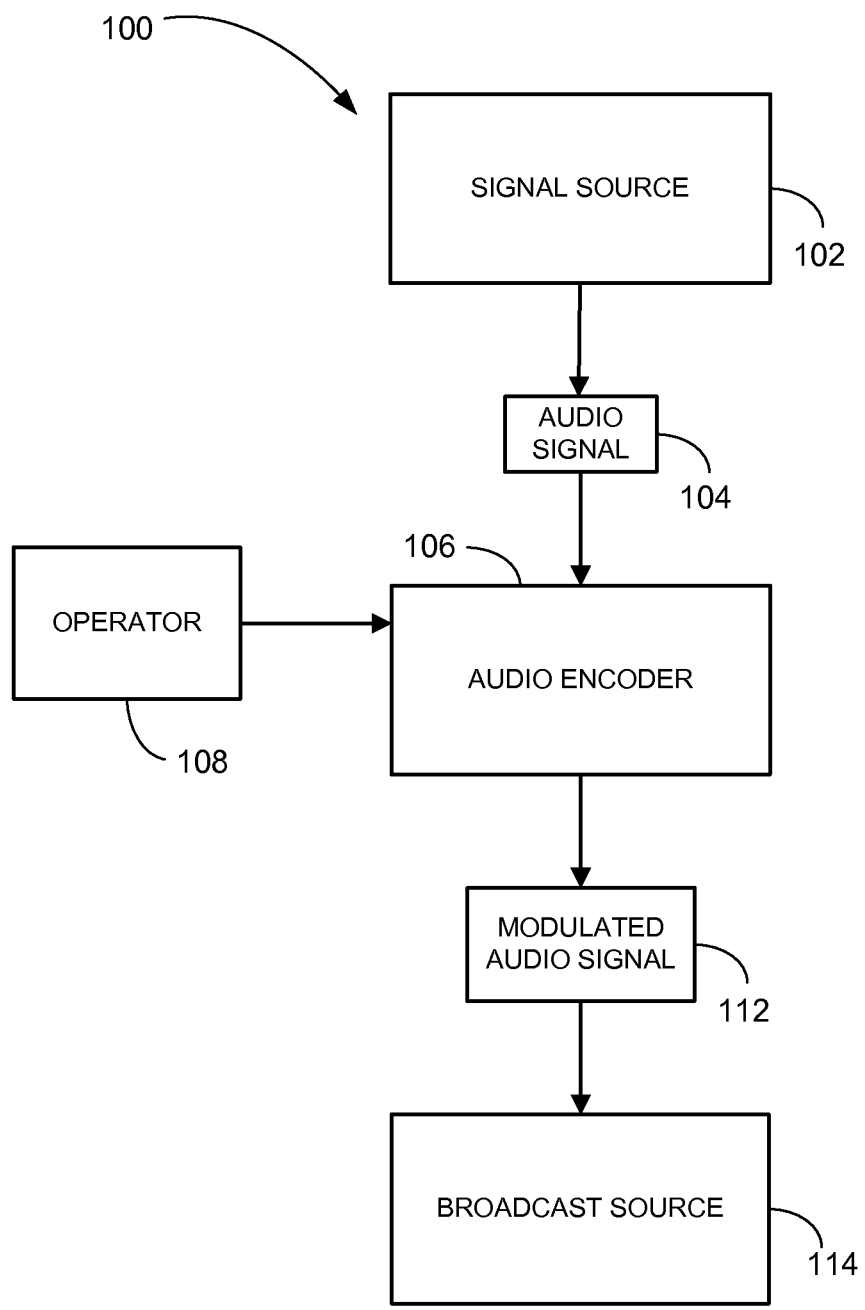
FIG. 1 is a block diagram of an example encoding system, according to an example embodiment.

FIG. 1 illustrates an example encoding system 100. The encoding system 100 is an example platform in which one or more embodiments of an encoding method may be used. However, the encoding may also be performed within other platforms.

An audio signal 104 may be provided from a signal source 102 to an audio encoder 106 in the encoding system 100. The audio signal 104 is described by a set of numerical values samples. In some embodiments, the audio signal 104 is in a digital. In some embodiments, the audio signal is in an analog format. In such embodiments, the analog signal may be digitized prior to further processing (e.g., encoding or decoding). In some embodiments, the audio signal 104 may be a portion of a video signal that includes standard definition (SD) and/or high definition (HD) content signals in NTSC (National Television Standards Committee), PAL (Phase Alternation Line), SECAM (Systeme Electronique Couleur Avec Memoire), a MPEG (Moving Picture Experts Group) signal, a sequence of JPEGs (Joint Photographic Experts Group), a sequence of bitmaps, or other signal formats that transport of a sequence of images. The audio signal 104 may be a single channel audio signal, a two channel audio signal, or a greater than two channel audio signal (e.g., 5.1 surround sound or 7.1 surround sound). The form of the audio signal 104 may be modified to enable implementations involving various formats and qualities.

The signal source 102 is a unit that is capable of providing and/or reproducing audio electrically in the form of the audio signal 104. The signal source 102 may be, by way of examples, a digital audio tape (DAT) player with a DAT, a tape player with a cassette tape, a compact disc (CD) player with a CD, or the like. Examples of the signal source 102 when the audio signal 104 is a part of a video signal includes a professional grade video tape player with a video tape, a camcorder, a video file server, a computer with an output port, a digital versatile disc (DVD) player with a DVD disc, and the like.

An operator 108 may interact with the audio encoder 106 to control its operation to encode echoes in the audio signal 104, thereby producing a modulated audio signal 112 that may be provided to a broadcast source 114. In an example embodiment, the operator 108 may include a person that interacts with the audio encoder 106 through the use of a computer or other electronic control device. The operator 108 may consist entirely of hardware, firmware, and/or software, or other electronic control device that directs operation of the audio encoder 106 in an automated manner.

The modulated audio signal 112 may be provided to the broadcast source 114 for distribution and/or transmission to an end-user that may listen to the audio content associated with the modulated audio signal 112. The broadcast source 114 may deliver the modulated audio signal 112 to one or more listeners in formats including analog and/or digital audio or video by storage medium such as DVD, tapes, and other fixed medium and/or by transmission sources such as television broadcast stations, cable, satellite, wireless and Internet sources that broadcast or otherwise transmit content. In on example embodiment, the broadcast source 114 may be a computer system. In some embodiments, the modulated audio signal 112 is encoded at the broadcast source 114 prior to delivering the modulated audio signal 112 to the one or more viewers. In some embodiments, additional encoding (e.g., MPEG encoding) occurs at the audio encoder 106, the broadcast source 114, or anywhere else in the production chain after encoding.

Figure 2:
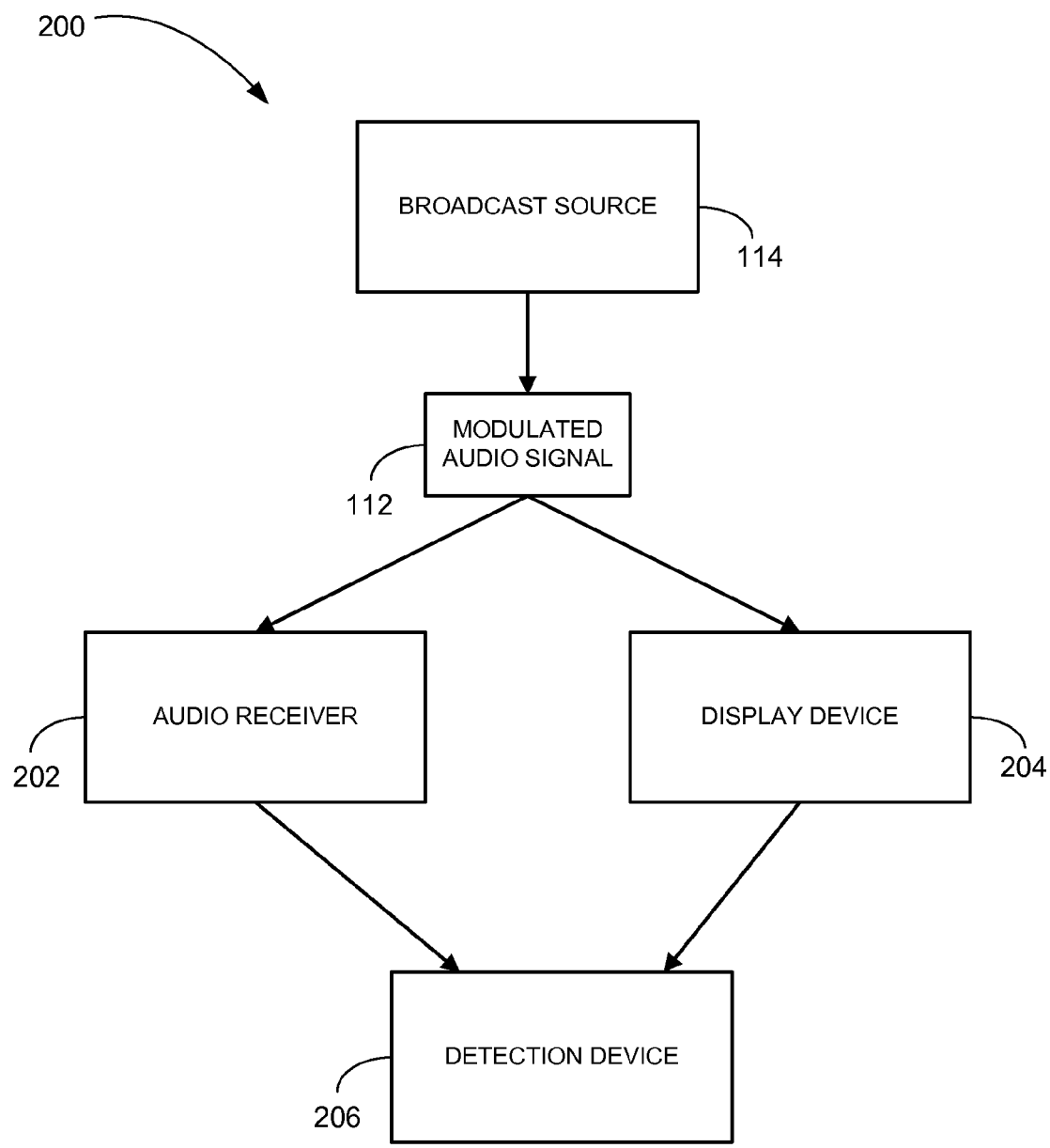
FIG. 2 is a block diagram of an example decoding system, according to an example embodiment.

FIG. 2 illustrates an example decoding system 200. The decoding system 200 is an example platform in which one or more embodiments of a decoding method may be used. However, the decoding may also be performed within other platforms.

The detection system 200 may send the modulated content signal 112 from the broadcast source 114 (see FIG. 1) to an audio receiver 202 and/or a display device 204. The audio receiver 202 may receive an audio transmission from the broadcast source 114 that includes the modulated audio signal 112, while the display device 204 may receive a video transmission from the broadcast source 114 that includes the modulated audio signal 112.

Examples of the audio receiver 202 include a portable radio player, a stereo receiver, a computer radio player, or the like. Examples of the display device 204 include projection televisions, plasma televisions, liquid crystal displays (LCD), personal computer (PC) screens, digital light processing (DLP), stadium displays, digital recorders (e.g., digital video recorders (DVRs)), devices that may incorporate displays such as toys and personal electronics, and the like. In some embodiments, the detection device 206 is made integral with the audio receiver 202 or the display device 204.

The detection device 206, when in positioned in proximity to the audio receiver 202, the display device 204, or both, receives the modulated audio signal 112 and seeks to detect and/or decode the echo modulation. The detection device 206 may receive the modulated audio signal 112 through the use of an integrated microphone, a direct connection (e.g., through a wire or wireless connectivity), or otherwise received.

When echo modulation is detected and/or decoded by the detection device 206, any resulting data may be used for a wide variety of purposes. For example, the data may represent, by way of example, a web site address, identification data (e.g., who owns a movie, who bought a movie, who produced a movie, where a movie was purchased, etc.), a promotional opportunity (e.g., an electronic coupon), authentication data (e.g., that a user is authorized to receive the content signal), non-pictorial data, and the like. The data may be used to track content (e.g., the showing of commercials). The data may provide an indication of a presence of rights associated with the modulated audio signal 112, provide electronic game play enhancement, be a uniform resource locator (URL), be an electronic coupon, provide an index to a database, or the like. Multiple representations may be encoded within the modulated audio signal 112.

Figure 3:
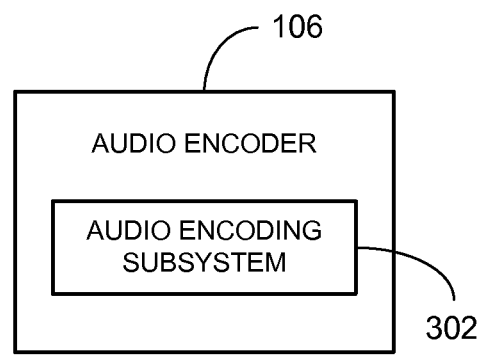
FIG. 3 is a block diagram of an example audio encoder that may be deployed within the encoding system of FIG. 1, according to an example embodiment.

FIG. 3 illustrates an example audio encoder 106 that may be deployed in the encoding system 100 (see FIG. 1), or otherwise deployed in another system. The audio encoder 106 is shown to include an audio encoding subsystem 302 to modulated the audio signal 104 with echoes to create the modulated audio signal 112.

Figure 4:
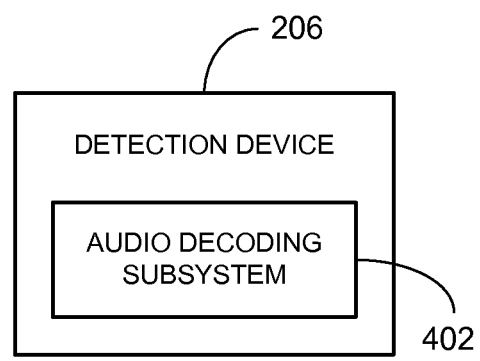
FIG. 4 is a block diagram of an example detection device that may be deployed within the decoding system of FIG. 2, according to an example embodiment.

FIG. 4 illustrates an example detection device 206 that may be deployed in the decoding system 200 (see FIG. 1), or otherwise deployed in another system. The detection device 206 is shown to include an audio decoding subsystem 402 to detect and/or decode modulated echoes within the modulated audio signal 112.

Figure 5:
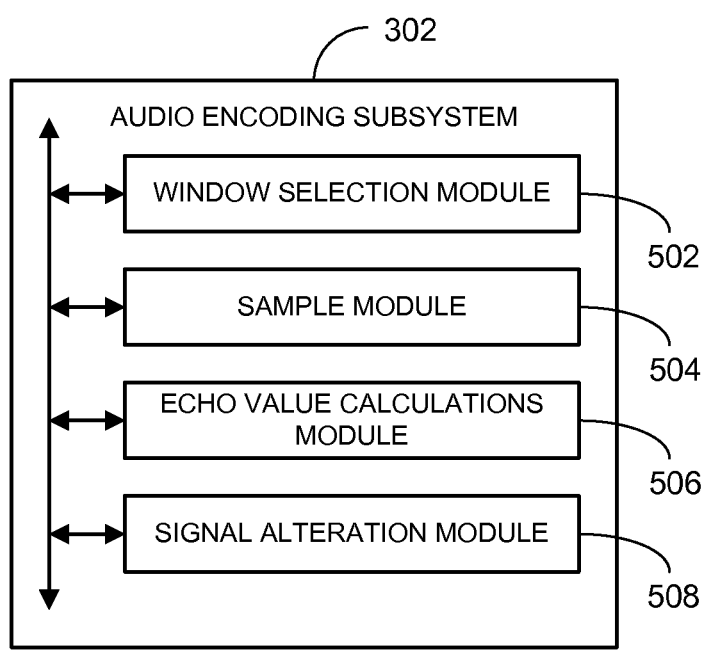
FIG. 5 is a block diagram of an example audio encoding subsystem that may be deployed within the audio encoder of FIG. 3, according to an example embodiment.

FIG. 5 illustrates an example audio encoding subsystem 302 that may be deployed in the audio encoder 106, or otherwise deployed in another system. One or more modules are included in the audio encoding subsystem 302 to enable modulation of echoes in the audio signal 104. The modules of the audio encoding subsystem 302 that may be included are a window selection module 502, a sample module 504, an echo value calculations module 506, and/or a signal alteration module 508. Other modules may also be included.

The window selection module 502 selects a number of samples for a window where modulation will occur.

The sample module 504 obtains intensity of sample values for the window of the audio signal 104. In some embodiments, a sample is a single data point of the audio signal 104 in a single audio channel of the audio signal 104.

The echo value calculations module 506 calculates echo values for the window. In some embodiments, an echo value has a fraction of the intensity of a corresponding sample and is at a time delay from the corresponding sample.

The signal alteration module 508 alters the audio signal 104 in the window using a windowing function and echo values.

Figure 6:
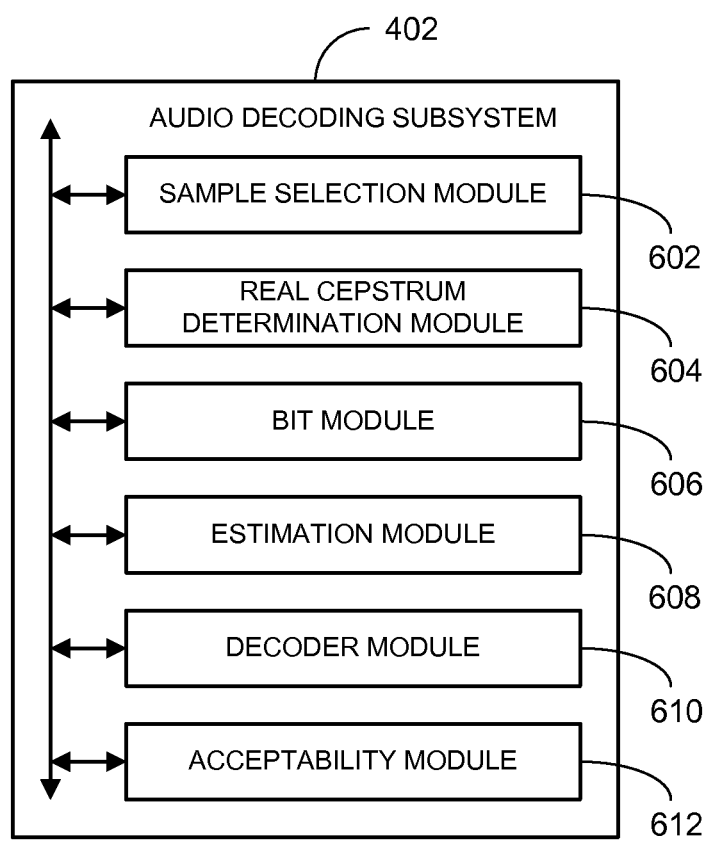
FIG. 6 is a block diagram of an example audio decoding subsystem that may be deployed within the detection device of FIG. 4, according to an example embodiment.

FIG. 6 illustrates an example audio decoding subsystem 402 that may be deployed in the electronic figurine 206, or otherwise deployed in another system. One or more modules are included in the audio decoding subsystem 402 to enable detecting and/or decoding of echoes in the modulated audio signals 112. The modules of the audio decoding subsystem 402 that may be included are a sample selection module 602, a real cepstrum determination module 604, a bit module 606, an estimate module 608, a decoder module 610, and/or an acceptability module 612. Other modules may also be included.

The sample selection module 602 selects a number of samples for a window of the modulated audio signal 112. The modules 604-610 (or a portion of the modules) may be used in an attempt to decode data from the modulated audio signal 112. Depending on the acceptability of the results as determined by the acceptability module 612, the sample selection module 602 may select different samples of the window and again use the modules 604-612 (or a portion of the modules)

in an attempt to decode data from the modulated audio signal 112. For example, the sample selection module 602 may advance by ten samples (or any other number of samples) and continue to attempt to decode data from the modulated audio signal 112. Depending on implementation, the sample selection module 602 may continue to try different possible samples for a window until a certain qualification is met (e.g., less that a certain error rate), or may try all or a subset of the possible window sample selections and select the window sample selection with the smallest error rate. Other implementations may also be used.

The real cepstrum determination module 604 determines real cepstrum values for a window of the modulated audio signal 112. The window includes a number of samples.

In some embodiments, the bit module 606 compares the real cepstrum values to a threshold, identifies some of the real cepstrum values as being encoded with a positive echo based on the threshold comparison, identifies other real cepstrum values as being encoded with a negative echo based on the threshold comparison, and associates a first bit value (e.g., a bit of 1) with the real cepstrum values of the positive echo and a second bit value (e.g., a bit of 0) with the real cepstrum values of the negative echo.

In some embodiments, the estimate module 608 estimates widths and/or means of underlying Gaussian distribution by the real ceptstrum values for a number of windows.

The decoding performed by the decoder module 610 may be a soft decode or a hard decode. In some embodiments, the decoder module 610 decodes the bits obtained by the bit module 606. In some embodiments, decoder module 610 performs a decode using the real cepstrum values, the widths of the underlying Gausian distribution, and/or the means of the underlying Gausian distribution using a Low Density Parity Check (LDPC) decoder based on an additive Gaussian white noise (AGWN) model.

Figure 7A:
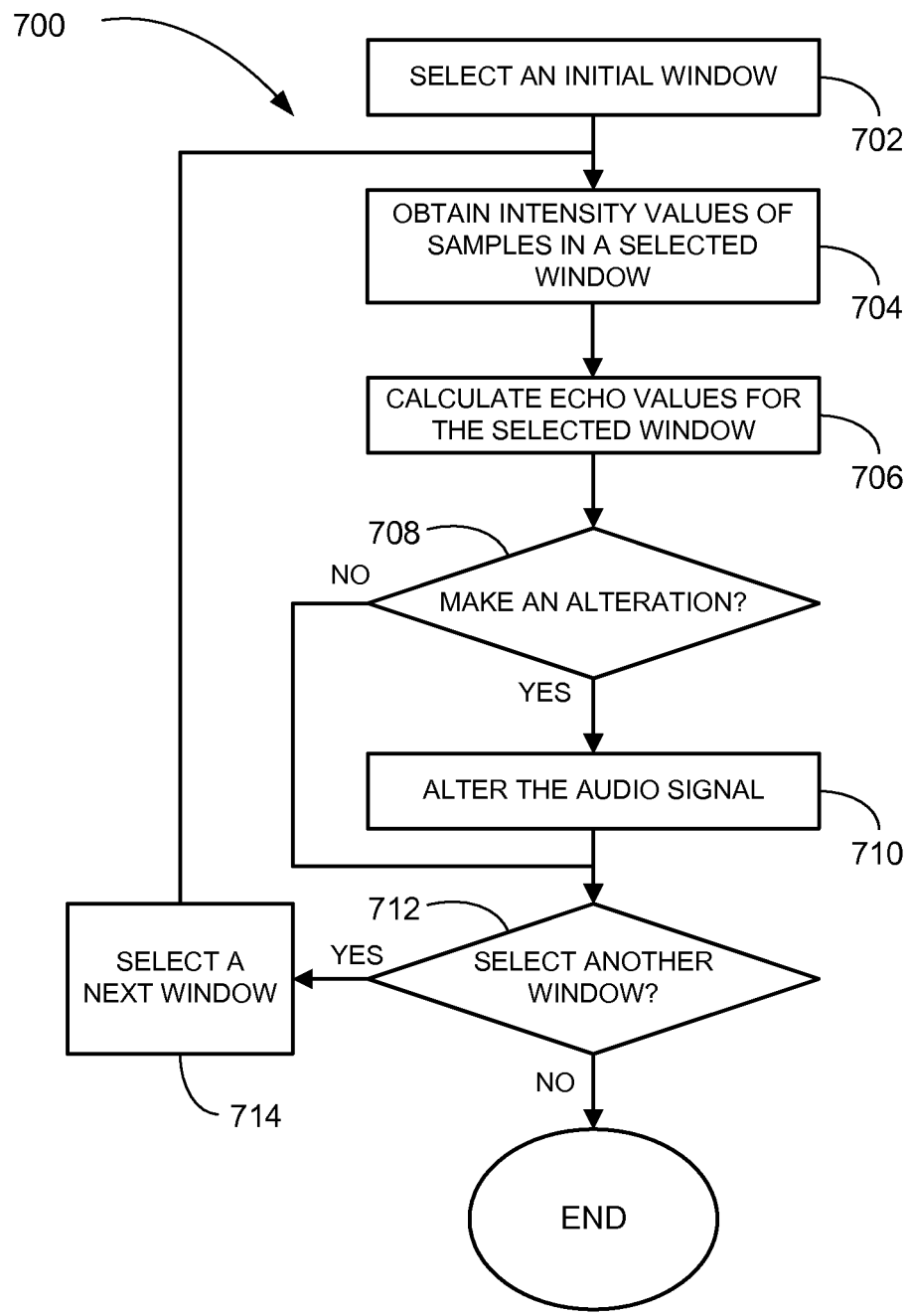
FIG. 7A is a block diagram of a flowchart illustrating method for audio encoding, according to an example embodiment.

FIG. 7A illustrates a method 700 for audio modulation according to an example embodiment. The method 700 adds echoes to the audio signal 104. The method 700 may be performed by the audio encoder 106 of the system 100 (see FIG. 1), or may be otherwise performed.

An initial window of the audio signal 104 may be selected at block 702.

Intensity values of samples in a window (e.g., the selected window) are obtained at block 704. The sample is a numerical value that defines the characteristics of the audio signal 104. The value tells something (e.g., loudness) about the sound at the instant the sample was taken. The numeric value may be positive or negative and centered around zero such that zero corresponds to zero sound. In another embodiment, no sound may correspond to a numeric value of 16,000. In one embodiment, the audio may be associated with a compact disc and 44,100 samples may be taken per second of the digital audio signal. In another embodiment, the audio may be associated with a digital audio tape (DAT) and 48,000 samples may be taken per second of the digital audio signal.

The values may be represented between −0.5 and 0.5, an integer between 0 and 32,000, −16,000 to 16,000, or the like. The range values may be based on a format of the digital audio signal.

A single sample is associated with a fraction of a second for a particular channel of the audio signal 104. For example, when there is one sample per fraction of a second for one channel for mono audio, two samples per fraction of a second for two channels for stereo, and more than two samples per fraction of a second for more than two channels.

Echo values are calculated for the selected window at block 706.

At decision block 708, a determination may be made whether to make an alteration to the audio signal 104. If a determination is made to make the alteration, the alteration to the audio signal 104 is made at block 710. The alteration includes adding an echo by modulation or encoding to the audio signal 104. If a determination is made at decision block 708 not to make the alteration or on the completion of the operations at block 710, the method 700 may proceed to decision block 712.

The encoding performed at block 710 is, in one embodiment, performed by adding weak, windowed echoes to the given digital audio signal. If the samples are described by numbers centered so that zero corresponds to no sound then echoing without windowing corresponds to adding a specified fraction (between 0 and 1 for a positive echo and between 0 and −1 for a negative echo) offset by a specified time delay to the original signal sample numbers. This value may be designated as the encoding intensity parameter. If the samples are described by numbers not centered in this way, then such echoing corresponds to adding the specified fraction of the offset from the zero sound numerical value to the sample numbers. The larger the fraction the more audible the resulting echo will be but also the easier it will be to decode. A specified fraction of 0 corresponds to no encoding.

The modulated echoes that are added to the audio signal 104 at block 710 may be positive echoes or negative echoes. A positive echo is when a fraction of an intensity offset is added to a sample of a digital audio signal. A negative echo is when a fraction of the intensity offset is subtracted from a sample of a digital audio signal.

In one embodiment, a positive echo represents a data bit of 1 and a negative echo represents a data bit of 0. In another embodiment, a positive echo represents a data bit of 0 and a negative echo represents a data bit of 1. In other embodiments, presence or absence of echoes are used to represent data. In one embodiment, the presence of an echo represents a data bit of 1 and the absence of an echo represents a data bit of zero. In another embodiment, the presence of an echo represents a data bit of 0 and the absence of the echo represents a data bit of 1.

The fraction may be a value between zero and one. In some embodiments, the fraction is selected (e.g., by the audio encoder 106 or by a user of the audio encoder 106) based on characteristics of the underlying audio, the desired degree of perceptibility of the encoding, or both. However, other scaled values may also be used. In one particular embodiment, the fraction is 0.15. The fraction of 0.15 may be a value used when the resulting echo is at least substantially imperceptible. In other embodiments, the fraction is greater or less than 0.15. In some embodiments, the fraction may be calculated or otherwise altered on the fly.

In some embodiments, the resulting echo added to the modulated audio signal 112 is at least substantially imperceptible, while in other embodiments the resulting echo is at least slightly perceptible. For example, with music (e.g., multiple musical instruments playing simultaneously), the modulating of the resulting echo may be substantially imperceptible, while the resulting echo for speech (e.g., a single person speaking) may be at least slightly perceptible.

The larger the value of the fraction, the greater likelihood that the echoing will be decodable. The smaller the value of the fraction, the less likely that the echoing will be audible or otherwise detectable. Different fractions may therefore be selected based on implementation.

By way of example, when the signals range from −0.50 to +0.50, and the typical audio signal is no bigger than 0.20, the added echo with the fraction of 0.15 is typically around 0.03.

The echoes of the method 700 are constructed using "windows" so that the effect of modulating a specific bit is confined to the samples that are associated with a specific window. The window is defined by a specified number of audio samples. The window length may be identified as being of a particular length (N). The window also defines the wrap around length. The window or windowing region specifies a length and having a wraparound characteristic, quality or property In some embodiments, the window length defines a wraparound length for the echoes. Consider adding a (positive or negative) echo to all N samples at a time, with a time-offset of d samples. For the last d samples from the window the time offset would lead to attempting to add to d samples which are beyond the end of the window. To avoid going beyond the end of the window, periodic boundary conditions may be used. For example, an echo is added to the $1^{st}$ sample whenever the N+1th sample would be added to (in the absence of wraparound) and add to the mth sample whenever the N+m th sample would be used. In one embodiment, this procedure is carried out in Fourier space.

The wrap around means that when the end of the window is reached, the echoes are added to the samples at the beginning of the window. This periodic boundary condition uses the length of the window as the period.

In some embodiments, adding an echo or echo value includes taking the original signal and adding a portion of the echo at an offset in time or at a delay. In one embodiment, the echo is added to a sample of the audio signal 104 in a same channel. In another embodiment, the echo is added to a sample of the audio signal 104 in a different channel. The different channel may have the same audio, at least substantially similar audio, or different audio than the channel from which the sample was taken.

The offsets may be selected in advance or calculated on the fly.

More than one echo may be added in each window, each echo corresponding to a different value of the time delay d and, in some embodiments, to a different encoding intensity parameter. The distinct echoes may encode the same or distinct bits.

With two echoes, double the information may be encoded. The increased information may be used for more accurate encoding, or transporting increased data. The data bits encoded in a particular window may be the same or different. The same data may be encoded two or more times in a window. For example, a first data bit may be encoded with a delay of 48 samples, and a second one may be encoded with a delay of 96 samples. The delays need not be multiples of each other.

The same fraction may be used for the different echoes or multiple fractions may be used.

In some embodiments, different fractions and different offsets may be tried for audio signals in advance of decoding. A desired fraction and offset may then be selected by a user or a machine (e.g., the audio encoder 106) based on performance or one or more other criteria.

The windows may be used so that the echo is added most strongly near the middle of the window and hardly at all at the end. This may be done to avoid audibility problems associated with wrap-around and with transitions from positive to negative echoes when different bits are encoded by distinct, neighboring windows. The windowing may be carried out using overlapping windows such that that if the encoding intensity parameter is taken to be zero, then encoding using echoes in conjunction with the windowing method may lead to encoded audio that is almost unchanged (e.g., up to accuracy of computer arithmetic) from the un-encoded audio input. The process of using the overlapping windows is performed in such a way that when the contributions of the overlapping windows are added, the signal is such that when decoding the un-encoded signal (up to the accuracy of computer arithmetic) would be recoverable if data were not encoded. The windows may overlap by 50%, 33%, or may otherwise overlap.

In one embodiment, the adding of the echo using a windowing function reduces a possibility that the wrap around characteristic will be detected or otherwise noticed. In one embodiment, the windowing function is a sine wave of period 2N or twice the number of samples N associated with a window that is slightly offset from zero. Other functions may be used, or other offsets may be used, or both.

At decision block 712, a determination may be made on whether to select another window. If a determination is made to select another window, another window may be selected at block 714 and the method 700 may return to block 704. If a determination is made not to select another window at decision block 712, the method 700 may terminate.

In some embodiments, a windowing function w(n) may be defined for N values associated with a window. The process of "windowing" includes multiplying each of the N audio sample values with the corresponding value of the w function.

In one embodiment, the windowing function has the property that the underlying audio signal is at least substantially unchanged when no echo is added.

In some embodiments, the windowing function w(n) satisfies two criteria. The first criterion is that the output of the function be small near both the beginning and the end of the series of N values for which it is defined. The second criterion is that applying the encoding algorithm will lead to the unchanged condition.

In one embodiment, mathematically the second criterion is that for n from 1 to N/2 inclusive: $w(n+N/2)^2+w(n)^2=1$. In another embodiment, mathematically the second criterion is that for n from 1 to N/3 inclusive: $w(n+2N/3)^2+w(n+N/3)^2+w(n)^2=1$.

An example embodiment that meets both criteria is the trigonometric function: $w(n)=\sin(\pi(t-\frac{1}{2})/N)$ defined for n=1 to N inclusive.

The echoes may be applied in Fourier space by multiplying each of the N values by the corresponding value of the windowing function to obtain the windowed samples, transforming the result to their Fourier space values, and then multiplying each value by the corresponding value of a complex embedding function, H(k) defined for the values k=1 to N inclusive with each k value corresponding to an echo at a different time offset. For the case of no encoding, H(k) is defined to be unity for all N distinct values of k. For each echo there is an additional term, proportional to the encoding intensity value for a positive or negative echo, depending on whether a 1 or a 0 is to be encoded in that echo. It may also be proportional to the discrete Fourier transform of the delta function $\delta(n-d)$ where n is a sample index and d is the time delay offset for that echo measured in samples.

In one embodiment, multiplication of the Fourier space samples to be encoded by their corresponding H(k) terms, followed by additional windowing and performance of an inverse discrete Fourier transform on the results, is equivalent to adding echoes to the audio signal 104 with wrap-around. In some embodiments, the Fourier transform is a fast Fourier transform.

In one embodiment, each sample is be encoded twice—once in a window and once in an overlapping window that is offset by half the window length. The encoding of the samples may be schematically represented by overlapping arcs.

An example embodiment of an implementation of the audio modulation method is as follows: A sample is multiplied by the windowing function, the result is added to the echo, and that result is then multiplied by the windowing function again. The offset is then increased by half a window length and the process is repeated. Half of the samples in the window length will then be handled by both the first window and the second window. The answers from both of these components are then added.

The number of echoes to be encoded in each set of samples of length N may be selected. A corresponding time delay for each of the echoes may also be selected. For example, two echoes in each set of N samples with time delays 30 and 60 samples may be respectively selected.

A method for determining the encoding intensity parameters may be selected. The positive and negative parameters may be of the same or different magnitude (though of different signs) for positive and negative echoes. The parameters may be the same or different for each of the distinct echoes encoded in a set of N samples. They may be constant for an entire piece of audio content or else be determined adaptively, optionally having different values for different parts of the audio content. The values may be chosen depending on the characteristics of the audio content or on other factors, including the degree of audibility acceptable for the given application The bits to be encoded may be selected. The bits may include both content bits and bits used for error correction.

N samples of the audio content signal may be obtained.

From the bits to be encoded, the bits to be encoded in these N samples are selected.

The N samples are windowed.

The discrete Fourier transform of the windowed samples is calculated.

Each resulting value is multiplied by the corresponding value of H(k). The results are windowed once more.

The discrete inverse Fourier transform of result of the multiplication is calculated.

The resulting values are indexed N/2+1 to N inclusive and the resulting values are stored.

The resulting values indexed 1 to N/2 inclusive are taken and added to the stored values obtained from the previous pass of this procedure. The results are the final encoded values for these N/2 samples.

The procedure is repeated with N samples starting with an offset of N/2 samples from the previous samples, so that the samples indexed N/2+1 to N inclusive from this pass are used as the samples indexed 1 to N/2 inclusive during the next pass.

the procedure is repeated one or more times to encode a portion or all of the entire audio content of the audio signal 104, each time using a set of N samples which overlap the previous set by N/2 samples (or N/3 samples in another embodiment). The procedure may be adapted for the first N/2 and final N/2 samples of content that as a result may or may not be encoded in an actual embodiment.

While the modulation of a single channel is described, the modulation may be performed in any one channel, in a combination of several channels, or in all channels that are defined for the audio content of the audio signal 104.

In one embodiment, the bit value one may be represented by an echo and the bit value zero may be represented by absence of echo. In one embodiment, the bit value zero may be represented by an echo and the bit value one may be represented by absence of echo.

Figure 7B:
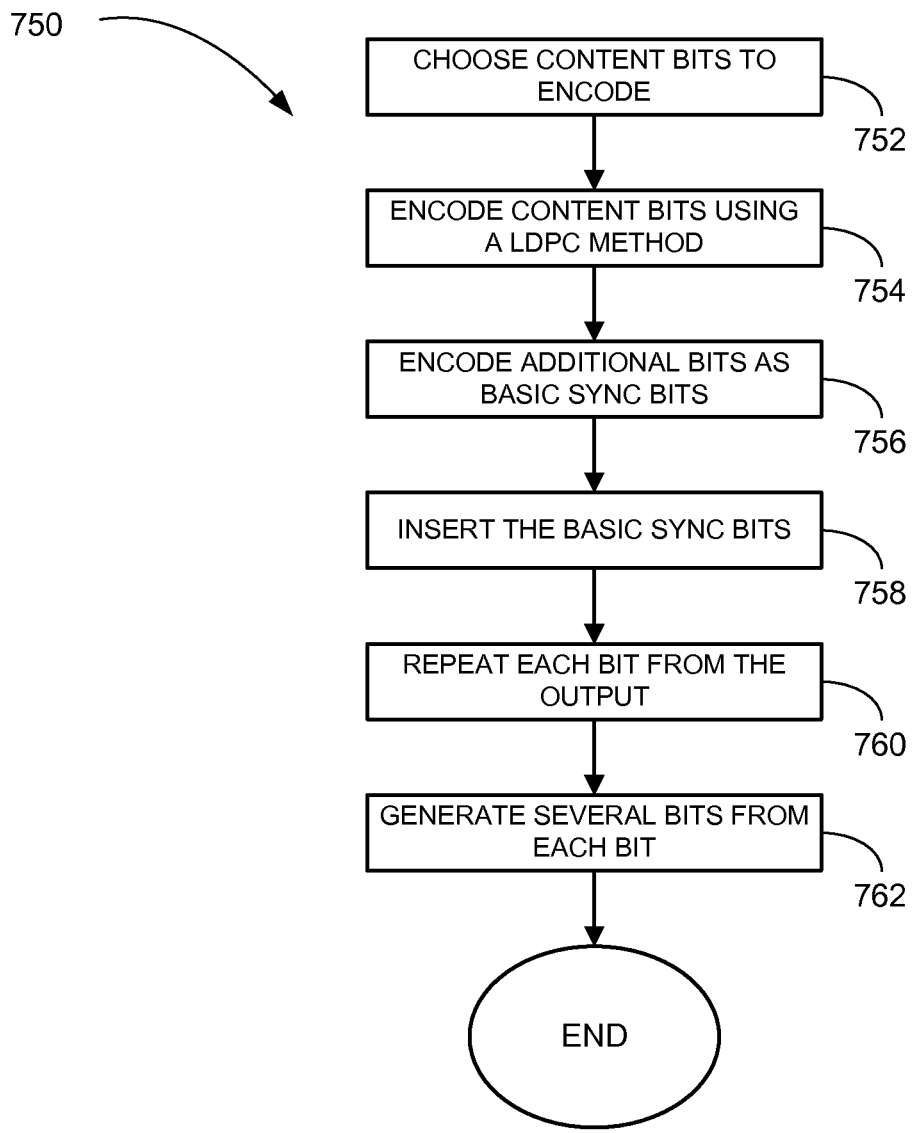
FIG. 7B is a block diagram of a flowchart illustrating method for bit selection, according to an example embodiment.

FIG. 7B illustrates a method 750 for bit selection according to an example embodiment. The method 750 may be used to select bits for echo modulation of audio signal 104. The method 750 may be performed by the audio encoder 106 of the system 100 (see FIG. 1), or may be otherwise performed.

At block 752, one or more content bits are selected for encoding. The number of content bits may be a few bits, tens of bits, hundreds of bits, or an even larger number of bits.

At block 754, content bits are encoded using an LDPC method with the content bits as input and a larger number of bits as output. These bits are designated as the BASIC LDPC BITS.

At block 756, additional bits may be encoded as BASIC synchronization bits in a pattern that can be made known to the detection device 206 (see FIG. 2).

At block 758, the BASIC synchronization bits are inserted into the bit stream of the output of the LDPC encoding step performed at block 754 in positions that may be made known to the detection device 206.

In some embodiments, each bit from the output of the operations performed at block 758 may be repeated several times at block 760.

In some embodiments, several bits may be generated from each bit of the output of the operations performed at block 758 with a known rule for generating the several bits from each input bit of value 1 and a known rule for generating the several bits from each input bit of value 0. Thus, in an example embodiment, each 1 bit might be represented by the 4 bits 1010 in that order and each 0 bit might be represented by the 4 bits 0101 in that order.

The repeated or generated bits obtained from the BASIC synchronization bits may be referred to as enhanced synchronization bits. The repeated or generated buts obtained from the basic LDPC bits may be refereed to as enhanced LDPC bits.

Figure 8:
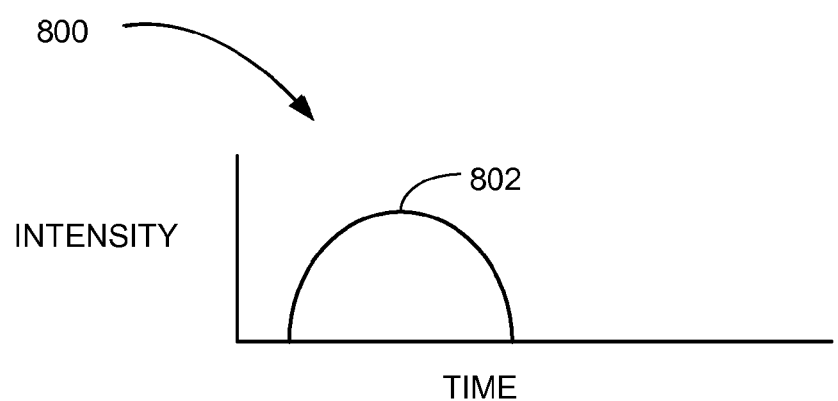
FIGS. 8-10 are illustrations of windows, according to example embodiments.

FIG. 8 is an illustration 800 of a first window 802, according to an example embodiment. The first window 802 may be used in encoding, or may be otherwise used. The first window 802 is shown as half a sine wave in a graph with intensity over time.

Figure 9:
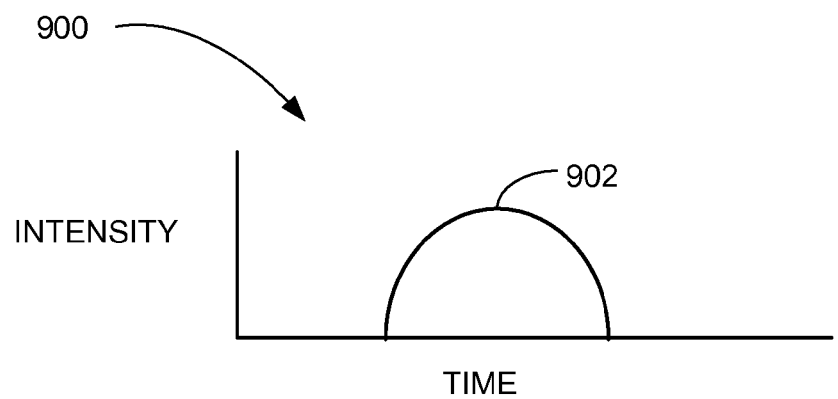

FIG. 9 is an illustration 900 of a second window 902, according to an example embodiment. The second window 902 may be used in encoding, or may be otherwise used. The second window 902 is shown as half a sine wave in a graph with intensity over time.

Figure 10:
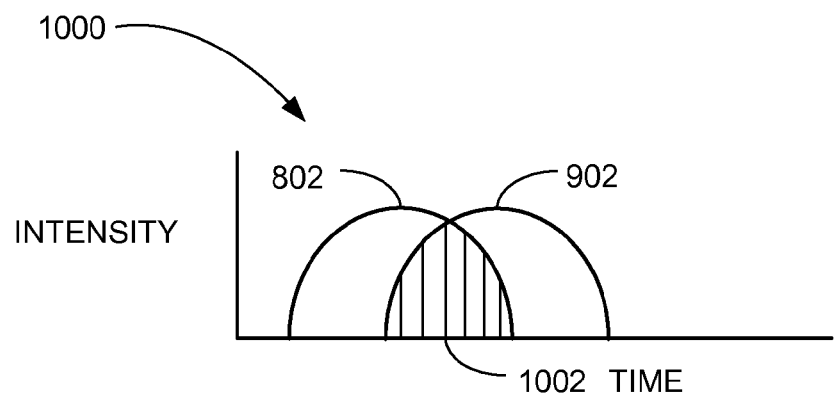

FIG. 10 is an illustration 1000 of the overlapping of the first window 802 and the second window 902, according to an example embodiment. The overlapping windows 802, 902 share an overlapping section 1002.

Figure 11:
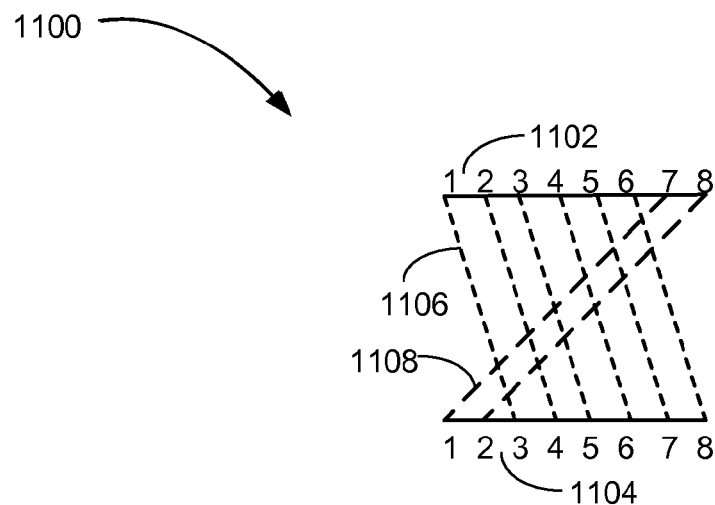
FIG. 11 is an illustrations of the application of a periodic boundary condition, according to an example embodiment.

FIG. 11 is an illustration 1100 of the application of a periodic boundary condition, according to an example embodiment. As illustrated, a first set of samples 1102 are offset two samples from a second set of samples 1104. The relationship between the samples is such that the echo from sample 1 of the first set of samples 1102 would be added to sample 3 of the second set of samples 1104, the echo from sample 2 of the first set of samples 1104 would be added to sample 4 of the second set of samples 1104, and so on. These relationships 1106 are shown in the illustration 1100.

However, because of the periodic boundary condition, the echo from sample 7 of the first set of samples 1102 would be added to sample 1 of the second set of samples 1104 and the echo from sample 8 of the first set of samples 1102 would be added to sample 2 of the second set of samples 1104. These relationships 1108 are shown in the illustration 1100.

Figure 12:
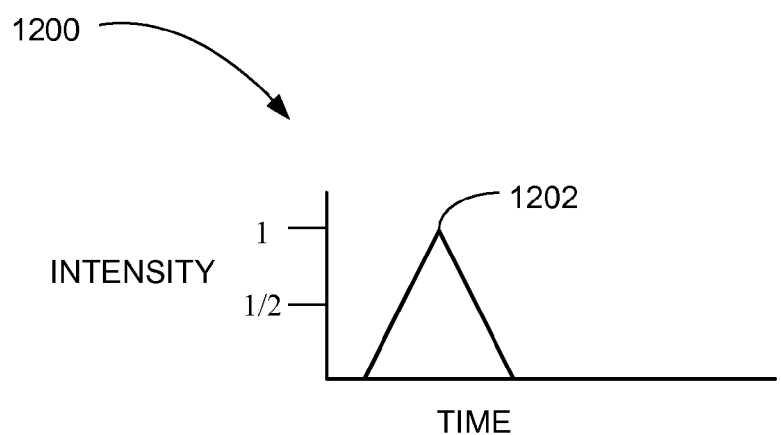
FIGS. 12-16 are illustrations of charts, according to example embodiments.

FIG. 12 is an illustration 1200 of a set of samples 1202 according to an example embodiment. The illustration 1200 shows an initial signal for unencoded audio. The value of the intensity of the set of samples 1202 is shown in the illustration 1200 as having a maximum value of 1.

Figure 13:
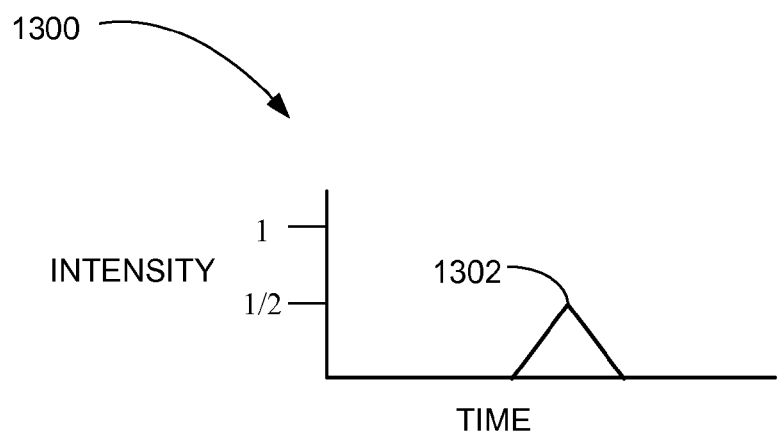

FIG. 13 is an illustration 1300 of a set of samples 1302 according to an example embodiment. The set of samples 1302 may be a positive echo of the set of samples 1202 (see FIG. 12). The value of the intensity of the set of samples 1302 is shown in the illustration 1300 as having a maximum value of ½.

Figure 14:
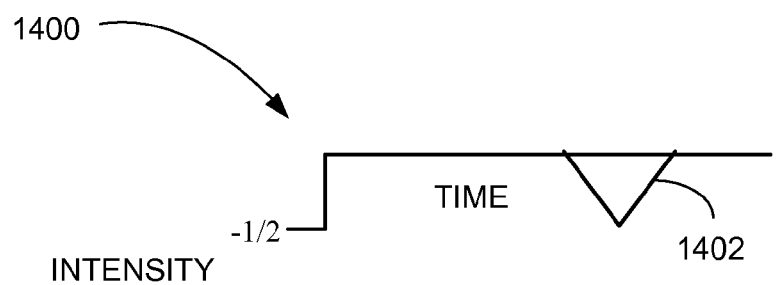

FIG. 14 is an illustration 1400 of a set of samples 1402 according to an example embodiment. The set of samples 1402 may be a negative echo of the set of samples 1202 (see FIG. 12). The value of the intensity of the set of samples 1402 is shown in the illustration 1400 as having a minimum value of −½.

Figure 15:
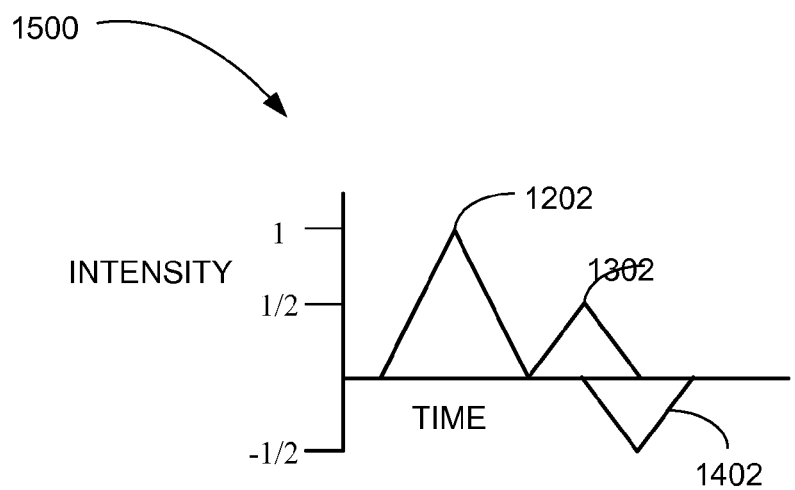

FIG. 15 is an illustration 1500 of the sets of samples 1202, 1302, 1402, according to an example embodiment. Thus, the illustration 1500 shows the initial with two echoes on the same scale.

Figure 16:
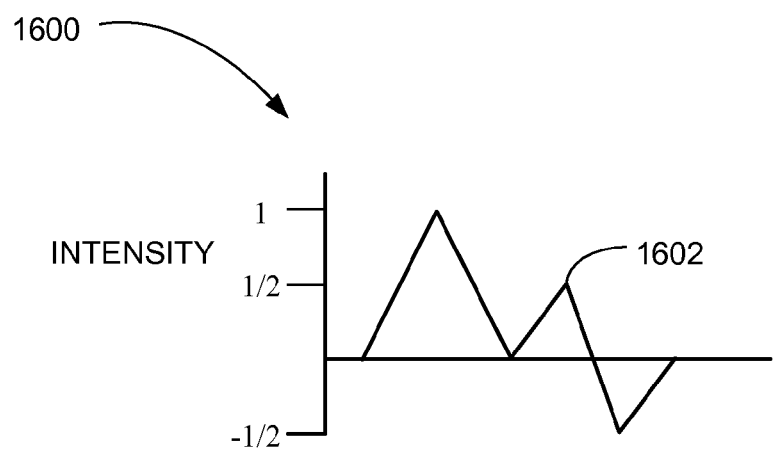

FIG. 16 is an illustration 1600 of a result of adding the sets of samples 1202, 1302, 1402 together, according to an example embodiment. The result of the combination of the sets of samples 1202, 1302, 1402 is an encoded signal 1602.

Figure 17A:
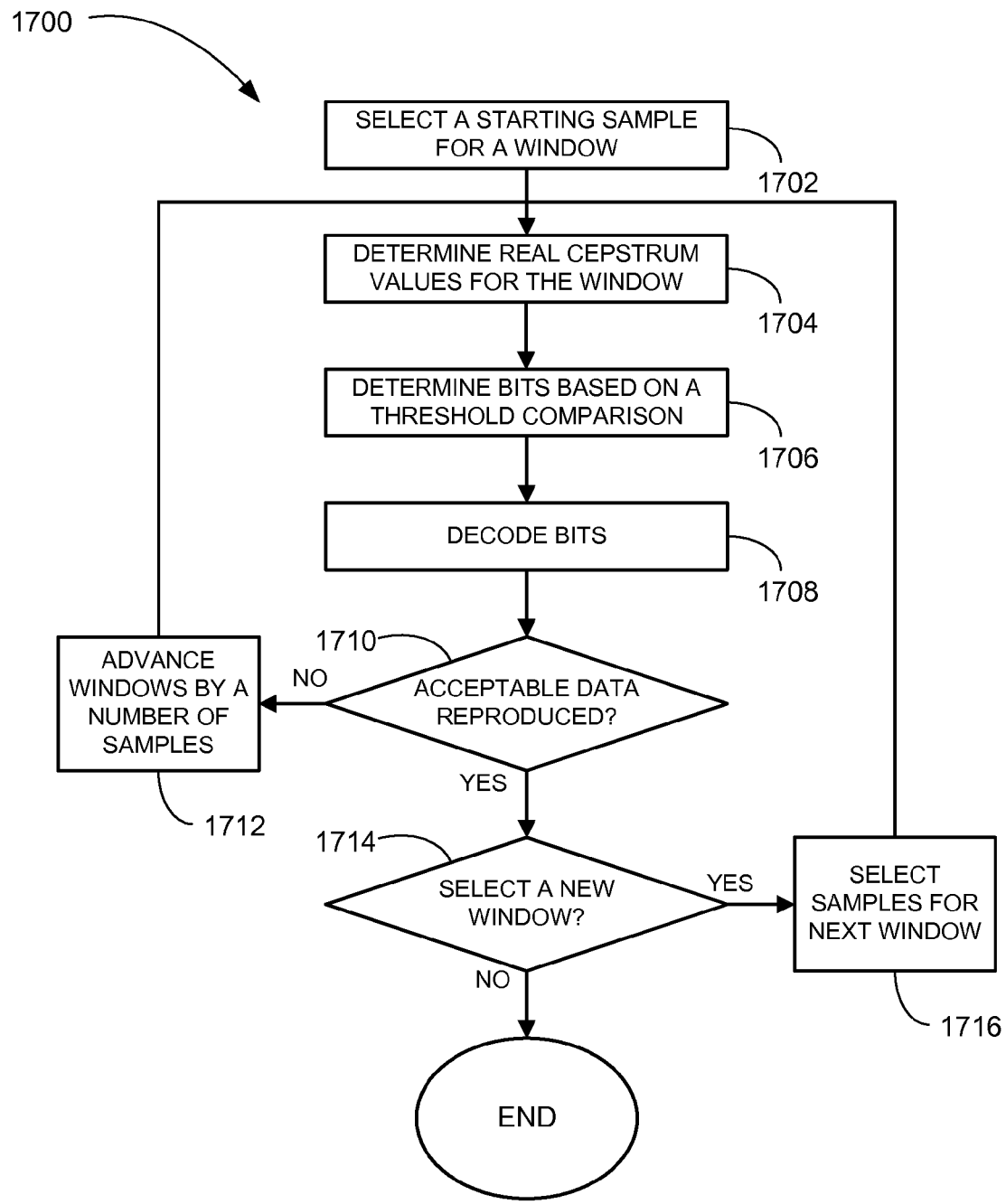
FIGS. 17A and B are block diagrams of flowcharts illustrating methods for audio decoding, according to example embodiments.

FIG. 17A illustrates a method 1700 for audio decoding, according to an example embodiment. The method 1700 may be performed by the detection device 206 of the system 200 (see FIG. 2), or may be otherwise performed.

In some embodiments, the method 1700 determines whether echoes are present in the modulated audio signal 112 and, when present, whether the echoes are positive echoes or negative echoes. The encoded ones and zeros may then be decoded by detecting positive or negative echoes.

A starting sample for a window may be selected at block 1702. The window length may be taken at an arbitrary position for N samples at a time.

In some embodiments, a supposition of the start of window may be made and then either all the possibilities (e.g., incrementing the window a sample at a time) or some of the possibilities may be tried. For example, a decoding attempt may be made every 1/10 of the window length. However, attempts may be made more or less frequently. The number of attempts that are made may be based on the type of application, particular decoding need, or both. Even when the supposition is not exactly correct, decoding may still be possible with error correction.

The real cepstrum values for the window may be determined at block 1704.

A number of bit values may be determined based on a comparison against a threshold value at block 1706. For example, real cepstrum values above a threshold may be determined to be one type of echo (e.g., a positive echo), while real cepstrum values equal to or below a threshold may be another type of echo (e.g., a negative echo).

In the absence of error correction, a cepstrum value that is greater than (or possibly equal to) some threshold is taken as the evidence that the decoding of a bit that was encoded by a positive echo, and a cepstrum value that is less than (or possibly equal to) the same or different threshold is taken as evidence that the decoding of the bit that was encoded by a negative echo. The threshold used may be either a fixed value, or alternatively a value determined adaptively using, for example, the statistical properties of measured cepstrum values. Some cepstrum values may be designated as ambiguous if they lie between the threshold values. By way of example, it could be the mean of some subset of cepstrum values if it is assumed or otherwise known that an approximately equal number of positive and negative echoes were encoded in the corresponding audio samples. The subset may optionally (but need not) be the set associated with a particular data packet. As an additional example, it may be the $25^{th}$ percentile of the measured distribution of some subset of cepstrum values if it is assumed or otherwise known that approximately 25% of the echoes encoded were negative echoes. The result of applying this threshold or these thresholds, together with knowledge of the relationship between positive and negative echoes, may then provide an estimated set of 0's and 1's and designated ambiguous values. These values may be used as input to a "hard" decode error correction decoder. Alternatively, the real cepstrum values themselves may be used as inputs to a soft error correction decoder.

In some embodiments, the decoding is a hard decode where a number of occurrences of numbers above and below some threshold are counted to obtain a result. In other embodiments, the decoding is a soft decode where positive and negative numbers are added to obtain a result.

In some embodiments, a soft repetition code may be used for decoding. In one embodiment, the soft repetition code may be used to recover the data when multiple echoes have been encoded in one or more windows with the same data. The soft repetition code may be used by looking at real cepstrum numbers. In an example embodiment where two echoes are encoded in a same window for a single bit of data, the soft decode on the window may include adding the resulting numbers together. In an example embodiment where two echoes are encoded in multiple windows for the same bit of data, real values are added from the echoes in the multiple windows to obtain the cepstrum number.

In one particular embodiment, if the resulting cepstrum number is positive a first result (e.g., a data bit of one) may be decoded, and if the result cepstrum number is negative a second result may be decoded (e.g., a data bit of zero). In other embodiments, further processing is performed on the cepstrum numbers before identifying a result.

In some embodiments, the type of decoding performed is blind decoding. A comparison to the original, unencoded audio is not performed during the decoding process. By not needing the original audio, additional opportunities for decoding in different environments may be available.

In some embodiments, the decoding method may further include a comparison between a first channel and a second channel. As described above, the bits encoded may be both content bits and extra bits added to enable error correction. Methods of adding extra bits and the associated error correction methods that recover data encoded in this way are described. The methods may be combined and be used to provide a synchronization method. Two decoding methods are "soft" decoding error correction methods in that they use combinations of the real values generated by the decoder (where the number of such real values is the same as the total number of content bits and extra bits added to enable error correction) to generate estimates of the content bits. "Hard" decoding which uses 1's and 0's as input to the decoder may also be used.

At decision block 1710, a determination is made as to whether acceptable data has been reproduced. If a determination is made that acceptable data has not been reproduced, the window may advance by a number of samples at block 1712 and the method 1700 may return to block 1704. If a determination at made at decision block 1710 that acceptable data has been reproduced, the method 1700 may proceed to decision block 1714.

At decision block 1714, a determination is made whether to select a new window. If a determination is made to select a new window, samples are selected for a next window at block 1716 and the method 1700 returns to block 1704. If a determination is made not to select a new window at decision block 1714, the method 1700 may terminate.

Figure 17B:
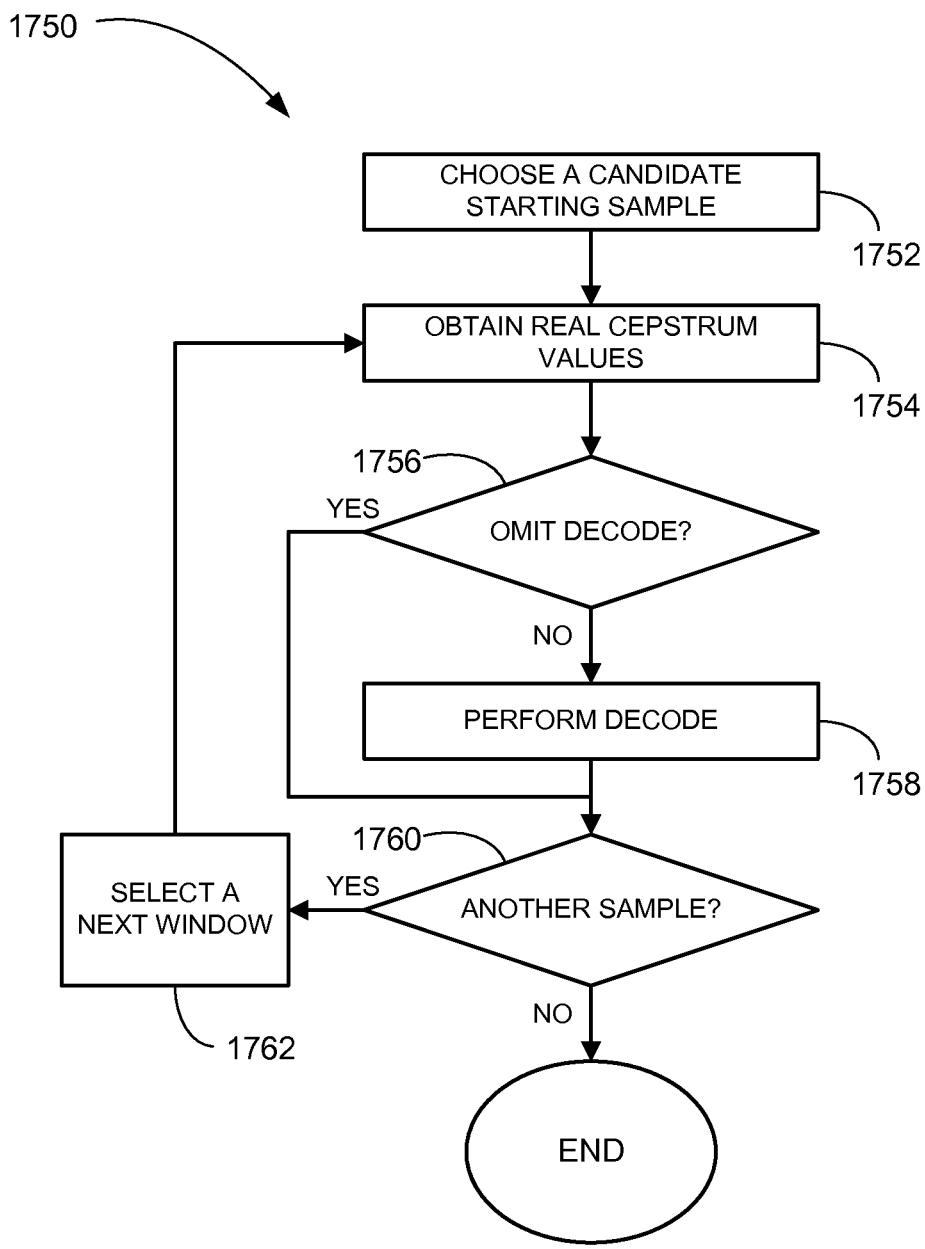

FIG. 17B illustrates a method 1750 for audio decoding, according to an example embodiment. The method 1750 may be performed by the detection device 206 of the system 200 (see FIG. 2), or may be otherwise performed.

A candidate starting sample for a window is selected at block 1752.

At block 1754, the real cepstrum values for a series of windows corresponding to the encoded bits for which a search is to be performed may be obtained.

At decision block 1756, a determination is made whether to omit performing an error correction decode on the real cepstrum values that do not correspond to synchronization bits. If a determination is made to perform the error correction decode, the error correction decode is performed at block 1758. If a determination is made not to perform the error correction decode at decision block 1756 or upon completion of the operations at block 1758, the method 1700 may proceed to decision block 1760.

In one embodiment, the error correction is always carried out at the operations performed at decision block 1756 may be omitted. In another embodiment, the error correction may be performed depending on the characteristics of the audio as measured by the audio decoding subsystem 402. In another embodiment, the error correction decode may be performed depending on the computer resources available to the audio decoding subsystem 402 at the time of decoding.

In another embodiment, the decision to perform the error correction decode is based on the synchronization parameters. Using the known positions of the cepstrum values corresponding to the enhanced synchronization bits, and assuming the candidate starting sample is correct or approximately correct, generate the corresponding bit values of the synchronization bits. If these values are close enough to the values of the synchronization values as encoded then the error correction decode is performed.

In one embodiment, generate the basic synchronization bits, using a hard decode for each value to generate the basic synchronization bits. In another example embodiment, use a soft decode to generate the basic synchronization bits. In these embodiments, a comparison of the pattern of basic and/or enhanced synchronization bits may be performed with the error correction decode if the match is close enough to some threshold.

In another example embodiment, a calculation of the correlation between the real cepstrum values and the rescaled and shifted encoded enhanced synchronization bits and proceed with the error correction decode when the correlation is close enough to some threshold.

In some embodiments, more than one criterion may be used. For example, the criteria listed in other embodiments above may be used to determine whether the error correction decode should be performed.

If the error correction decode is to be performed, in one embodiment soft decoding methods may be used at block 1758 on the real cepstrum values corresponding to enhanced error correction bits to obtain real values corresponding to the basic error correction bits. These values may be used as inputs to the error correction soft decode.

In another embodiment, a soft decode may be performed on the real capstrum values at block 1758 corresponding to the enhanced bits to obtain real cepstrum values corresponding to the basic bits and threshold those values to obtain bit values to be used for a hard error correction decode.

At decision block 1760, a determination may be made as to whether there is another sample. If a determination is made that there is another sample, a next window may be selected at block 1762 and the method 1700 may return to block 1754. If a determination is made at decision block 1760 that there is not another sample, the method 1700 may terminate.

In an example embodiment, one or more of the foregoing methods may be used as a quick-to-calculate method for generating candidates for alignment (synchronization).

Figure 18:
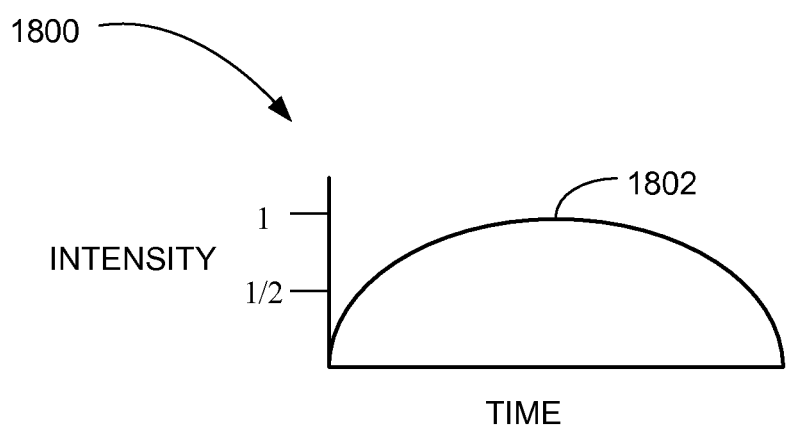
FIGS. 18 and 19 are illustrations, according to example embodiments.

FIG. 18 is an illustration 1800 of a windowing function 1802, according to an example embodiment. The windowing function 1802 may be used in decoding, or may be otherwise used. The windowing function 1802 is shown as half a sine wave in a graph with intensity over time.

Figure 19:
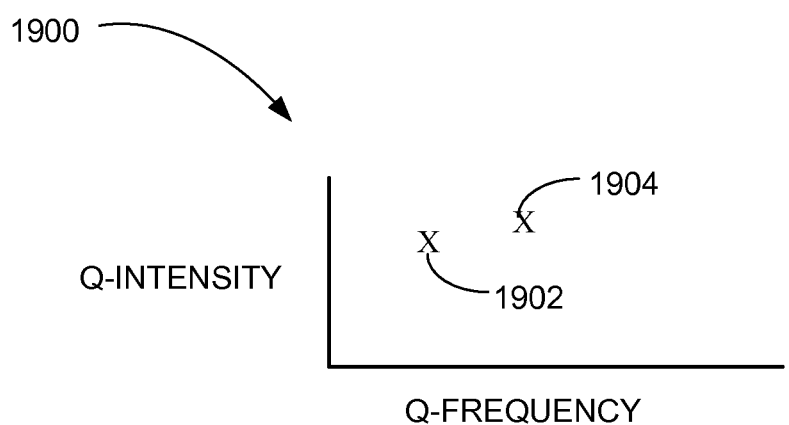

FIG. 19 is an illustration 1900 of cepstrum values, according to an example embodiment. The cepstrum values 1900 are shows as cepstrum values 1902, 1904. The cepstrum values 1902, 1904 are shown in a graph with Q-intensity over Q-frequency. As shown the cepstrum values 1902, 1904 reflect different echo time delays. While the cepstrum values 1902, 1904 are represented in the illustration 1900 as Q values, they may also represent K values in other illustrations.

Figure 20:
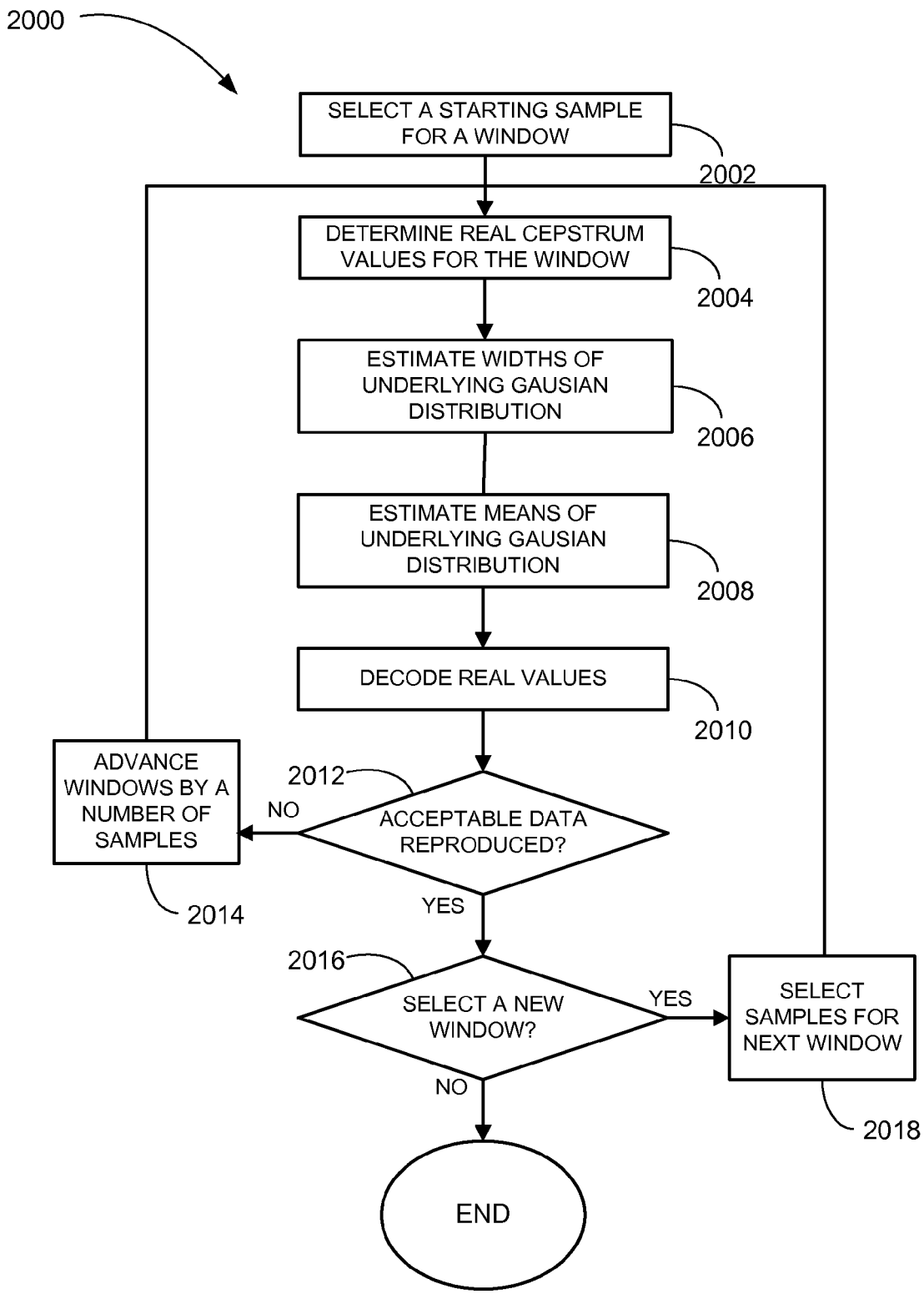
FIG. 20 is a block diagram of a flowchart illustrating a method for audio decoding, according to an example embodiment.

FIG. 20 illustrates a method 200 for audio decoding, according to an example embodiment. The method 1700 may be performed by the detection device 206 of the system 200 (see FIG. 2), or may be otherwise performed.

In some embodiments, the method 2000 determines whether echoes are present in the modulated audio signal 112 and, when present, whether the echoes are positive echoes or negative echoes. The encoded ones and zeros may then be decoded by detecting positive or negative echoes or the absence of an echo may indicate an encoded zero or one depending on the protocol used to encode.

A starting sample for a window may be selected at block 2002.

Real cepstrum values for the modulated audio signal 112 are determined at block 2004.

In some embodiments, estimates of the widths of underlying Gausian distribution by the real ceptstrum values are determined at block 2006.

In some embodiments, estimates of the menas of underlying Gausian distribution by the real ceptstrum values are determined at block 2008.

Real values are decoded at block 2010

In some embodiments, a soft decoded is performed at block 201 on the real cepstrum values, the widths of the underlying Gausian distribution, and/or the means of the underlying Gausian distribution using a Low Density Parity Check (LDPC) decoder based on an additive Gaussian white noise (AGWN) model.

In some embodiments, a low-density parity check (LDPC) code may be used on the cepstrum numbers at block 2010. The LDPC code may be used by calculating an estimate of the width and/or means of a Gaussian distribution. The estimate or a value larger than the estimate may be used as an input to the LDPC with the real cepstrum numbers (e.g., resulting from the soft repetition code) used to estimate the encoded data bits.

In one embodiment, the LDPC code may be used for error correction when the noise pattern from the modulated audio signal approximates additive white Gaussian noise (AWGN) or the distribution of the cepstrum values approximates samples drawn from two bell curves that may be offset from each other. The noise pattern may be from the underlying audio, the broadcasting path, digital to analog conversions, encoding, or the like.

In some embodiments, a repetition decode may be performed as follows. The content bits to be encoded are repeated a known number of times. The copies of the content bits (to be regarded as "extra bits" used for error correction) are then arranged in a known order with regard to the content bits. The copies may or may not be contiguous to their original content bits. This combination of content and error bits is what was previously encoded. On decoding, the real cepstrum values, in one embodiment, associated with each content bit and its copies are added, to produce one combined real cepstrum value for each content bit. These combined real cepstrum values may be used for thresholding to perform a hard decode or as values on which a soft decode is to be performed. In the case of hard decoding, the closeness of a combined (or not combined) real cepstrum value to the threshold may be used as a guide as to whether a particular bit should be ignored by the decoder.

The content bits may be encoded using a Low Density Parity Check (LDPC) encoder or another encoder to produce content bits and additional bits ("parity bits") to enable error correction. The resulting bits may be encoded using repetition encoding. The resulting bit stream is then encoded as described above. The decoder first performs a repetition decoding on the real cepstrum values, returning one combined real cepstrum value for each content bit and one combined real cepstrum value for each parity bit. These combined real cepstrum values may be used as input to the relevant soft decoder (e.g. a soft LDPC decoder if the encoding was LDPC.) Alternatively, the repetition decoder may be used with thresholding and its output used as input to the relevant hard decoder (e.g. a hard LDPC decoder if the encoding was LDPC.).

A LDPC decoder using a soft decode based on an additive white Gaussian noise model (AWGN) may be used for decoding audio signals that have or have not passed through broadcast channels, whether or not the data are strictly the sum of data taken from Gaussian distributions. The model uses input of an estimate of the noise variance. One embodiment of estimating the variance assumes that an approximately equal number of positive and negative echoes were encoded. The assumption is that the distribution of the input real cepstrum values (or combined real cepstrum values if a repetition encoder was used) is a sum of values drawn from two Gaussian or approximately Gaussian distributions which have different means and possibly different variances. The variance of the upper Gaussian is estimated by calculating the mean square distance from the $75^{th}$ percentile of data between the $75^{th}$ and $100^{th}$ percentile of the combined distribution of the input real cepstrum values. The variance of the lower Gaussian is estimated by calculating the mean square distance from the $25^{th}$ percentile of data between the 0th and 25th percentile of the combined distribution of the input real cepstrum values. The larger of these values is used as a guide to the estimated variance to be input; being regarded as a lower bound on a suitable value to be used for the decoder. Another embodiment may use a constant value for the variance based, for example, on knowledge of the transmission path of the audio since encoding.

At decision block 2012, a determination is made as to whether acceptable data has been reproduced. If a determination is made that acceptable data has not been reproduced, the window may advance by a number of samples at block 2014 and the method 2000 may return to block 2004. If a determination at made at decision block 2012 that acceptable data has been reproduced, the method 2000 may proceed to decision block 2016.

At decision block 2016, a determination is made whether to select a new window. If a determination is made to select a new window, samples are selected for a next window at block 2018 and the method 2000 returns to block 2004. If a determination is made not to select a new window at decision block 2016, the method 2000 may terminate.

Figure 21:
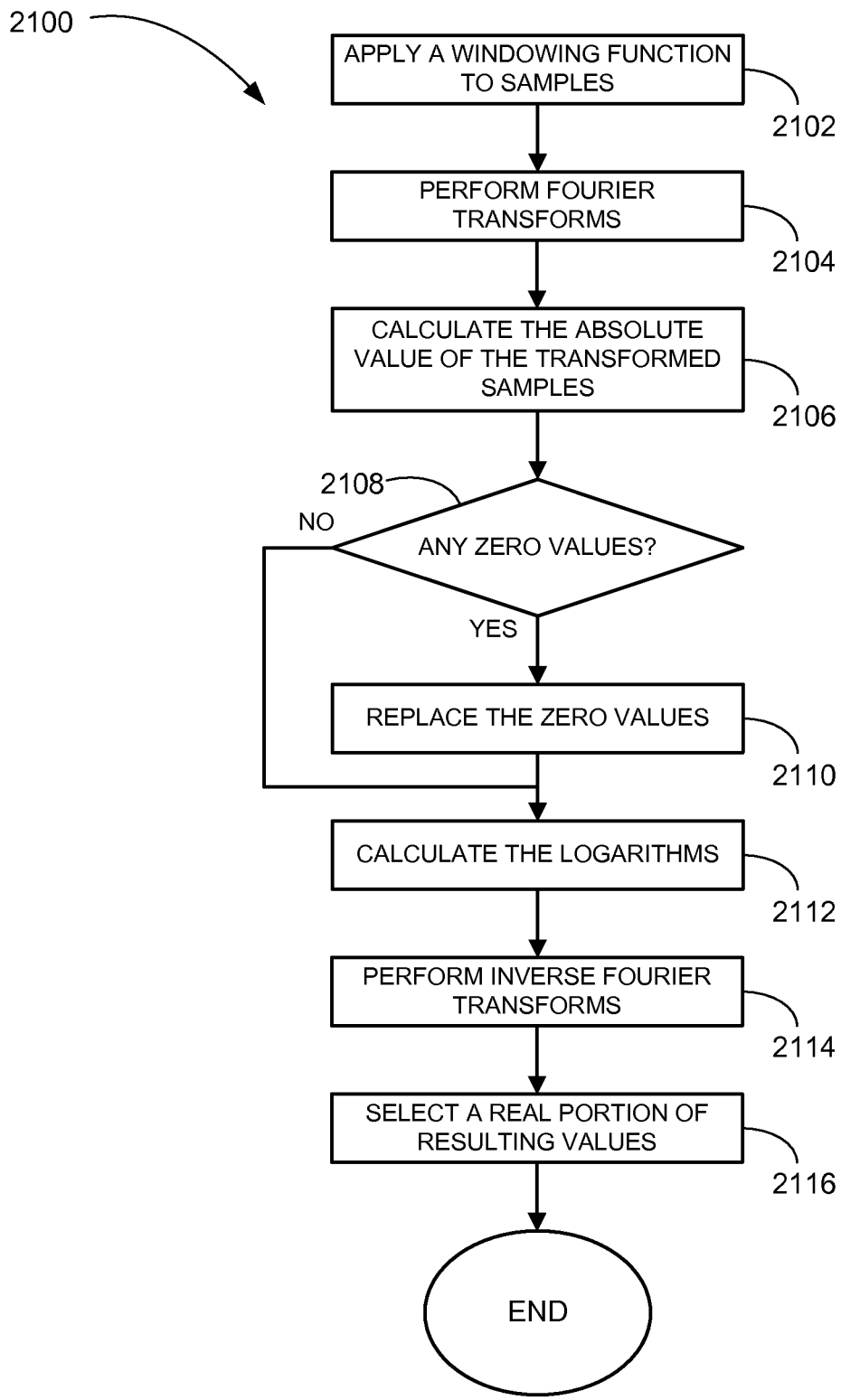
FIG. 21 is a block diagram of a flowchart illustrating method for calculating cepstrum values, according to an example embodiment.

FIG. 21 illustrates a method 2100 for calculating cepstrum values, according to an example embodiment. The method 2100 may be performed at the block 1704, block 2004, or may be otherwise performed.

At block 2102, a windowing function is applied to a number of samples create windowed samples. At block 2104, a Fourier transform is performed windowed samples to create transformed samples. In some embodiments, the Fourier transform is a Fast Fourier Transform. An absolute value is calculated for the transformed samples to create absolute value samples at block 2106.

At decision block 2108, a determination may be made as to whether any of the absolute value samples have a zero value. If a determination is made that some of the absolute value samples have a zero value, the zero value of the absolute value samples may be replaced by a small number at block 2110. If a determination made that none of the absolute values have a zero value at decision block 2108 or upon completion of the operations at block 2110, the method 2100 may proceed to block 2112.

Logarithms of the absolute value samples are calculated at block 2114 to create logged samples. Inverse Fourier transforms are performed on the logged samples at block 2116 to obtain cepstrum values. In some embodiments, the inverse Fourier transform is an inverse Fast Fourier Transform.

A real portion of the cepstrum values are selected at block 2118 as a real cepstrum values. In some embodiments, the selection performed at block 2118 includes selecting the cepstrum values that correspond to the echo time delays. For example, if the delay were 48 samples and 96 samples take the $49^{th}$ and $97^{th}$ cepstrum values (not the $48^{th}$ and $96^{th}$ values).

Figure 22:
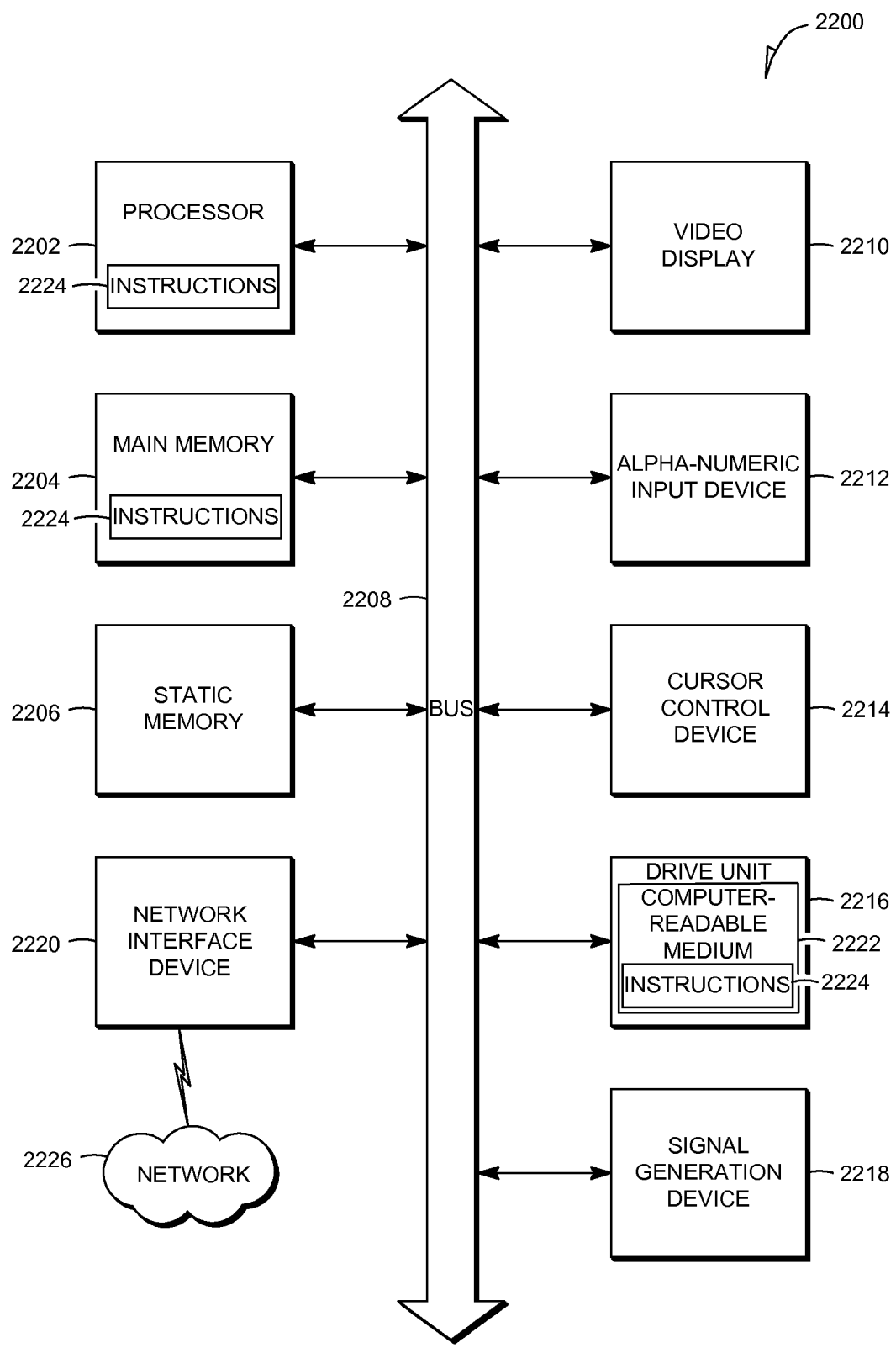
FIG. 22 is a block diagram of a machine in the example form of a computer system within which a set of instructions for causing the machine to perform any one or more of the methodologies discussed herein may be executed.

FIG. 22 shows a block diagram of a machine in the example form of a computer system 2200 within which a set of instructions may be executed causing the machine to perform any one or more of the methods, processes, operations, or methodologies discussed herein. The signal source 102, the broadcast source 112, or both may operate on one or more computer systems 2200. The audio encoder 106, the audio receives 202, the display device 204, and/or the detection device 206 may include the functionality of the one or more computer systems 2200.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, a kiosk, a point of sale (POS) device, a cash register, an Automated Teller Machine (ATM), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2200 includes a processor 2212 (e.g., a central processing unit (CPU) a graphics processing unit (GPU) or both), a main memory 2204 and a static memory 2206, which communicate with each other via a bus 2208. The computer system 2200 may further include a video display unit 2210 (e.g., a liquid crystal display (LCD) or a cathode ray tube (CRT)). The computer system 2200 also includes an alphanumeric input device 2212 (e.g., a keyboard), a cursor control device 2214 (e.g., a mouse), a drive unit 2216, a signal generation device 2218 (e.g., a speaker) and a network interface device 2220.

The drive unit 2216 includes a computer-readable medium 2222 on which is stored one or more sets of instructions (e.g., software 2224) embodying any one or more of the methodologies or functions described herein. The software 2224 may also reside, completely or at least partially, within the main memory 2204 and/or within the processor 2212 during execution thereof by the computer system 2200, the main memory 2204 and the processor 2212 also constituting computer-readable media.

The software 2224 may further be transmitted or received over a network 2226 via the network interface device 2220.

While the computer-readable medium 2222 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, solid-state memories, and optical media, and magnetic media.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

The inventive subject matter may be represented in a variety of different embodiments of which there are many possible permutations.

Thus, methods and systems for echo modulation have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

What is claimed is:

1. A method comprising:
   obtaining intensities of a plurality of first sample values in a first window of an audio signal, a particular first sample being a single data point of the audio signal in a single audio channel;
   calculating a plurality of first echo values for the first window, a particular first echo value of the plurality of first echo values having a fraction of the intensity of a corresponding first sample of the plurality of first sample values and being at a time delay from the corresponding first sample;
   obtaining intensity of a plurality of second sample values in a second window of the audio signal, the second window overlapping a portion of the first window;
   calculating a plurality of second echo values for the second window, a particular second echo value of the plurality of second echo values having the fraction of the intensity of a corresponding second sample of the plurality of second sample values and being at the time delay from the corresponding second sample;
   obtaining intensity of a plurality of third sample values in a third window of the audio signal, the third window overlapping a portion of the second window;
   calculating a plurality of third echo values for the third window, a particular third echo value of the plurality of third echo values having the fraction of the intensity of a corresponding third sample of the plurality of third sample values and being at the time delay from the corresponding third sample;
   altering the audio signal in the second window using a windowing function, the plurality of second echo values, an overlapping first portion of the plurality of first echo values, and an overlapping second portion of the plurality of second echo values, wherein a value portion of the plurality of second echo values that extend beyond the second window based on the time delay is included at a beginning of the second window based on a periodic boundary condition.

2. The method of claim 1, further comprising:
   analyzing the audio signal to determine characteristics of the audio signal; and
   selecting the fraction based on the characteristics of the audio signal.

3. The method of claim 1, wherein the particular echo is a positive echo, the intensity of the positive echo being added to the intensity of the corresponding sample.

4. The method of claim 1, wherein the particular echo is a negative echo, the intensity of the negative echo being subtracted from the intensity of the corresponding sample.

5. The method of claim 1, wherein altering the audio signal comprises:
   altering the audio signal in the same channel as the plurality of sample values to include the plurality of echo values in the window to create the modulated audio signal.

6. The method of claim 1, wherein altering the audio signal comprises:
   altering the audio signal in a different channel from where the plurality of sample values were taken to include the plurality of echo values in the window to create the modulated audio signal.

7. The method of claim 1, further comprising:
   determining the intensity of a plurality of additional sample values in an additional window of the audio signal, the additional window defined by the number of the plurality of additional sample values;
   calculating a plurality of additional echo values for the additional window, a particular additional echo value of the plurality of additional echo values having an additional fraction of the intensity of a corresponding additional sample of the plurality of additional sample values and being and at an additional time delay from the corresponding additional sample; and
   altering the audio signal to include a plurality of echo values in the additional window, wherein the portion of the plurality of additional echo values that extend beyond the additional window based on the additional time delay is included at the beginning of the additional window based on the periodic boundary condition.

8. The method of claim 7, wherein the number of the plurality of additional sample values is the same as the number of the plurality of sample values.

9. The method of claim 7, wherein the additional time delay is the same amount of time as the time delay.

10. The method of claim 7, wherein the additional time delay is a different amount of time as the time delay.

11. The method of claim 7, wherein the additional fraction is the same as the fraction.

12. The method of claim 7, wherein the window and the additional window are the same size.

13. The method of claim 1, wherein the audio signal is a portion of a video signal.

14. The method of claim 1, wherein additional sound added to the audio signal by inclusion of the plurality of echo values is at least substantially imperceptible in the modulated audio signal.

15. The method of claim 1, wherein altering the audio signal is performed in Fourier space.

16. The method of claim 1, wherein the audio signal is a multi-channel audio signal.

* * * * *